(12) United States Patent
Jakobsen et al.

(10) Patent No.: US 12,032,656 B2
(45) Date of Patent: Jul. 9, 2024

(54) CONCEPT FOR GENERATING TRAINING DATA AND TRAINING A MACHINE-LEARNING MODEL FOR USE IN RE-IDENTIFICATION

(71) Applicant: Grazper Technologies ApS, Copenhagen K (DK)

(72) Inventors: Thomas Jakobsen, Copenhagen K (DK); David Guldbrandsen, Copenhagen K (DK); Max La Cour Christensen, Copenhagen K (DK); Ulrik Ishoej Soendergaard, Copenhagen K (DK)

(73) Assignee: Grazper Technologies ApS, Copenhagen (DK)

( * ) Notice: Subject to any disclaimer, the term of this patent is extended or adjusted under 35 U.S.C. 154(b) by 210 days.

(21) Appl. No.: 17/446,174

(22) Filed: Aug. 27, 2021

(65) Prior Publication Data

US 2022/0092348 A1    Mar. 24, 2022

(30) Foreign Application Priority Data

Sep. 22, 2020  (EP) .................................... 20197545

(51) Int. Cl.
*G06F 18/214* (2023.01)
*G06T 7/70* (2017.01)
(Continued)

(52) U.S. Cl.
CPC .............. *G06F 18/214* (2023.01); *G06T 7/70* (2017.01); *G06V 20/30* (2022.01); *G06V 40/172* (2022.01)

(58) Field of Classification Search
CPC ....... G06F 18/214; G06T 7/70; G06V 10/454; G06V 10/764; G06V 20/30; G06V 40/172
See application file for complete search history.

(56) References Cited

U.S. PATENT DOCUMENTS

| | | | |
|---|---|---|---|
| 2020/0226421 A1* | 7/2020 | Almazan | G06N 3/045 |
| 2021/0117773 A1* | 4/2021 | Sollami | G06N 3/084 |

FOREIGN PATENT DOCUMENTS

| | | | |
|---|---|---|---|
| JP | 2006343791 A | 12/2006 | |
| JP | 2017117139 A | 6/2017 | |
| JP | 2018055248 A | 4/2018 | |

OTHER PUBLICATIONS

Ahmed et al., "An Improved Deep Learning Architecture for Person Re-Identification", 2015 (Year: 2015).*

(Continued)

*Primary Examiner* — Ruiping Li
(74) *Attorney, Agent, or Firm* — 2SPL Patent Attorneys PartG mbB; Kieran O'Leary

(57) ABSTRACT

Examples relate to a concept for generating training data and training a machine-learning model for use in re-identification. A computer system for generating training data for training a machine-learning model for use in re-identification comprising processing circuitry configured to obtain media data, the media data comprising a plurality of samples representing a person, an animal or an object. The processing circuitry is configured to process the media data to identify tuples of samples that represent the same person, animal or object. The processing circuitry is configured to generate the training data based on the identified tuples of samples that represent the same person, animal or object.

13 Claims, 3 Drawing Sheets

(51) Int. Cl.
  *G06V 20/30* (2022.01)
  *G06V 40/16* (2022.01)

(56) References Cited

OTHER PUBLICATIONS

Takuya Shiraishi, Introduction to Deep Learning: Image Classifi-cation (6) Metric,[online],Nov. 18, 2019, https://www.softbanktech.co.jp/special/blog/cloud_blog/2019/0068/.

Zheng Liang et al.: "MARS: A Video Benchmark for Large-Scale Person Re-Identification", Sep. 17, 2016, Lecture Notes in Com-puter Science; [Lecture Notes in Computer Science; Lect. Notes Computer], Springer Berlin Heidelberg, Berlin, Germany, pp. 868-884.

Stefan Schneider et al.: "Past, Present, and Future Approaches Using Computer Vision for Animal Re-Identification from Camera Trap Data", Arxiv. Org, Cornell University Library, 201 Olin Library Cornell University Ithaca, NY.

Fangyu Wu et al.: "Vehicle re-identification in still images: Appli-cation of semi-supervised learning and re-ranking", Signal Process-ing: Image Communication, vol. 76, Aug. 1, 2019, pp. 261-271.

Alexander Hermans et al.: "In Defense of the Triplet Loss for for Person Re-Identification", Arxiv. Org, Cornell University Library, 201 Olin Library Cornell University Ithaca, NY.

YingYing Zhang et al.: "Learning Incremental Triplet Margin for Person Re-identification", Arxiv. Org, Cornell University Library, 201 Olin Library Cornell University Ithaca, NY.

Mang Ye et al.; Deep Learning for Person Re-identification: A Survey and Outlook; Jan. 13, 2020; pp. 20; DOI: 10.1109/TPAMI.2021.3054775; Published in: IEEE Transactions on Pattern Analysis and Machine Intelligence.

Takuya Shiraishi, Introduction to Deep Learning: Image Classifi-cation (6) Metric,[online],Nov. 18, 2019, https://www.softbanktech.co.jp/special/blog/cloud_blogl2019/0068/.

\* cited by examiner

CONCEPT FOR GENERATING TRAINING DATA AND TRAINING A MACHINE-LEARNING MODEL FOR USE IN RE-IDENTIFICATION

CROSS-REFERENCE TO RELATED APPLICATION

This application claims priority to European Application 20197545.5, filed on Sep. 22, 2020. The content of this earlier filed application is incorporated by reference herein in its entirety.

FIELD

Examples relate to a concept for generating training data and training a machine-learning model for use in re-identification.

BACKGROUND

Visual person re-identification (short: re-id) systems serve the purpose of distinguishing or re-identifying people, from their appearance alone, in contrast to identification systems that seek to establish the absolute identity of a person (usually from facial features). Person re-identification systems are often implemented using a machine-learning model that is trained to generate a re-identification code based on image data representing different persons. Current methods for creating images for training re-identification systems often rely on large amounts of manual annotation work. This is work-intensive and slow.

SUMMARY

Various examples of the present disclosure are based on the finding, that contrary to the real-time nature of re-identification systems, where usually only a single sample of media data is used to generate a re-identification code, the training of the machine-learning models that are used for generating the re-identification codes is not limited by these constraints. On the contrary, in various examples, additional information can be gathered together with the samples of media data to be used for the training in order to allow for an automatic generation of training data for training such machine-learning models. Additionally, or alternatively, other systems may be employed that allow for a compilation of suitable training data.

In the proposed concept, a plurality of samples are obtained that are to be used for training the machine-learning model. These samples are processed, and samples that represent the same person, animal or object are grouped together. These groups, or "tuples", in turn, are used to generate the training data. The grouping of the samples into the different tuples can, for example, be performed using secondary information, such as the position of image samples in a sequence of image samples (e.g., a video stream), or wireless identifiers that are recorded with the respective sample. Alternatively, another system, e.g., another basic re-identification system, may be used to group the samples into tuples. These tuples may then be used as training data, e.g., in a triplet loss-based training of the machine-learning model, where two samples of a tuple are used as a baseline and a positive input, and a sample of another tuple is used as a negative input of the of the triplet loss-based training.

Various examples of the present disclosure relate to a computer system for generating training data for training a machine-learning model for use in re-identification. The computer system comprises processing circuitry configured to obtain media data. The media data comprises a plurality of samples representing a person, an animal or an object. The processing circuitry is configured to process the media data to identify tuples of samples that represent the same person, animal or object. The processing circuitry is configured to generate the training data based on the identified tuples of samples that represent the same person, animal or object. By programmatically grouping the samples into tuples of samples representing the same person, animal or object, suitable training data for training the machine-learning model may be generated.

In some examples, each sample is associated with secondary information characterizing the sample or the person, animal or object represented by the sample. The processing circuitry may be configured to identify the tuples of samples that represent the same person, animal or object based on the secondary information being associated with the respective samples. The secondary information may, for example, be used to identify the samples belonging to the same tuple without, or only partially, relying on the content of the samples.

One type of secondary information relates to an interrelationship of the respective samples. For example, at least some of the samples may be taken from a video stream, or more general from a sequence of images. Subsequent image samples of the video stream often show the same person, animal or object, and may thus be assigned to the same tuple. In other words, if the media data comprises a sequence of image samples, the secondary information may characterize a position of the respective sample within the sequence of image samples. The processing circuitry may be configured to identify the tuples of samples that represent the same person, animal or object based on the position of the respective samples within the sequence of image samples.

Another type of secondary information relates to the origin of the sample. For example, if the media data comprises media data of two or more cameras, the secondary information may characterize an origin of the respective sample with respect to the two or more cameras and a capture time of the sample. In this context, the term "origin" may correspond to the location of the camera providing the respective sample. The processing circuitry may be configured to identify the tuples of samples that represent the same person, animal or object based on the origin of the samples with respect to the two or more cameras and based on the capture time of the samples. This approach may be used in situations where the two cameras have a partially or nearly overlapping field of view, e.g., to identify persons, animals or objects that move from the field of view of one camera to the field of view of the other camera. Accordingly, the media data of the two or more cameras may show an at least partially overlapping field of view.

A third type of secondary information relates to additional information that is collected at the time the sample is taken. For example, each media data generation device (e.g., camera) may be linked to a wireless communication device that can be used to record wireless communication identifiers (e.g., Media Access Control addresses) of mobile devices of persons being recorded by the respective media data generation device. This wireless communication identifier may subsequently be used to identify samples that represent the same person (or animal or object). In other words, the secondary information may comprise information on a wireless communication identifier being recorded with the sample of the media data. The processing circuitry may be configured to identify the tuples of samples that represent the same person, animal or object based on the wireless communication identifiers being recorded with the respective samples.

Another application of the presented approach is in re-identification-based access control system, where the proposed approach can be used to perform the re-identification-based access control over a long time-span even as the appearance of the person gradually changes, e.g., due to growing hair, a sun tan or a growing beard. Accordingly, the plurality of samples may be obtained over a plurality of days from a re-identification-based access control system. The secondary information may comprise information on an identifier of a person provided by the re-identification-based access control system. A newly obtained sample may be added to the tuple of samples that represents the respective person. Various examples of the present disclosure provide a corresponding re-identification-based access control system comprising the computer system. The processing circuitry of the computer system may be configured to adapt a machine-learning model being used for re-identification in the re-identification-based access control system based on the generated training data. The newly-added tuple may be used to adapt the training of the respective machine-learning model.

In some examples, the use of secondary information may be foregone. For example, the processing circuitry may be configured to identify the tuples of samples using a first re-identification system. The training data may be generated for the training of a machine-learning model for use in a second re-identification system. In other words, an existing re-identification system (i.e. the first re-identification system) may be used to identify samples that are used to train a machine-learning model being used by a newly trained re-identification system (i.e. the second re-identification system).

In some cases, the plurality of samples may also contain samples that are unsuitable for use in the training of the machine-learning model, e.g., as no person, animal or object is shown, or as they are shown with too little detail. To avoid such samples being used for training, these samples may be discarded. For example, the processing circuitry may be configured to determine a presence of a person, animal or object in the samples of the plurality of samples, and to discard a sample if the determination of the presence of the person, animal or object fails.

Additionally or alternatively, the samples within the respective tuples may be evaluated with respect to their quality and discarded, if the quality is less than desired. For example, the processing circuitry may be configured to determine a quality of the samples of the tuples, and to remove a sample from a tuple if the quality of the sample is insufficient according to a pre-defined rule.

In visual person re-identification systems, the re-identification is often based on the face of the respective persons. Accordingly, one pre-defined rule may relate to the visibility of the face of the persons shown in the samples. In other words, the media data may represent a person. The quality of the samples of a tuple may be determined based on a visibility of a face of the person in the respective samples.

Another pre-defined rule may be based on a distance between re-identification codes being generated using an existing re-identification system. For example, the processing circuitry may be configured to use a re-identification system to generate (several) re-identification codes representing the person, animal or object represented by the respective samples. The quality of the samples of a tuple may be based on a distance between the (several) re-identification codes generated (in this way) for the samples of the tuple. This may enable an automatic evaluation of the quality of the samples of the respective tuple.

In general, the media data may be one of image data, video data, audio data, a three-dimensional representation of movement of an object and text-based media data. These are examples of types of media data that a suitable for use in re-identification.

The presented approach may be used to generate the training data that is used to train a respective machine-learning model. The generated training data may comprise the plurality of tuples of samples, with each tuple of samples comprising samples that represent the same person, animal or object. For example, the generated training data may comprise the plurality of samples, grouped by the tuple they are assigned to.

In some examples, the computer system may also be used to train the machine-learning model. In other words, the processing circuitry may be configured to train the machine-learning model using the generated training data. The machine-learning model may be trained to generate a re-identification code based on media data being provided at an input of the machine-learning model. By training the machine-learning model using the generated training data, an efficient training of the machine-learning model is enabled that requires less or zero manual effort in the generation of the training data.

For example, the machine-learning model may be trained using a triplet loss-based training, with the samples of a tuple being used as a baseline and a positive input of the triplet loss-based training. In a triplet loss-based training of the machine-learning model, the baseline input and the positive input are fed with media data representing the same person, animal or object, and a negative input is fed with media data representing another person, animal or object.

Various examples of the present disclosure relate to a corresponding computer-implemented method for generating training data for training a machine-learning model for use in re-identification. The method comprises obtaining media data. The media data comprises a plurality of samples representing a person, an animal or an object. The method comprises processing the media data to identify tuples of samples that represent the same person, animal or object. The method comprises generating the training data based on the identified tuples of samples that represent the same person, animal or object.

Various examples of the present disclosure relate to a computer system for training a machine-learning model for use in re-identification. The computer system comprises processing circuitry configured to obtain training data for training the machine-learning model. The training data is generated by a computer system as presented above. The processing circuitry is configured to train the machine-learning model using the obtained training data. The machine-learning model is trained to generate a re-identification code based on media data being provided at an input of the machine-learning model. By training the machine-learning model using the generated training data, an efficient training of the machine-learning model is enabled that requires less or zero manual effort in the generation of the training data.

For example, the machine-learning model may be trained using a triplet loss-based training, with the samples of a tuple being used as a baseline and a positive input of the triplet loss-based training. In a triplet loss-based training of the machine-learning model, the baseline input and the positive input are fed with media data representing the same person, animal or object, and a negative input is fed with media data representing another person, animal or object.

Various examples of the present disclosure relate to a corresponding computer-implemented method for training a machine-learning model for use in re-identification. The method comprises obtaining training data for training the machine-learning model. The training data is generated by a computer-implemented method for generating training data as presented above. The method comprises training the machine-learning model using the obtained training data. The machine-learning model is trained to generate a re-identification code based on media data being provided at an input of the machine-learning model.

Various examples of the present disclosure relate to a corresponding computer program having a program code for performing at least one of the above methods, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
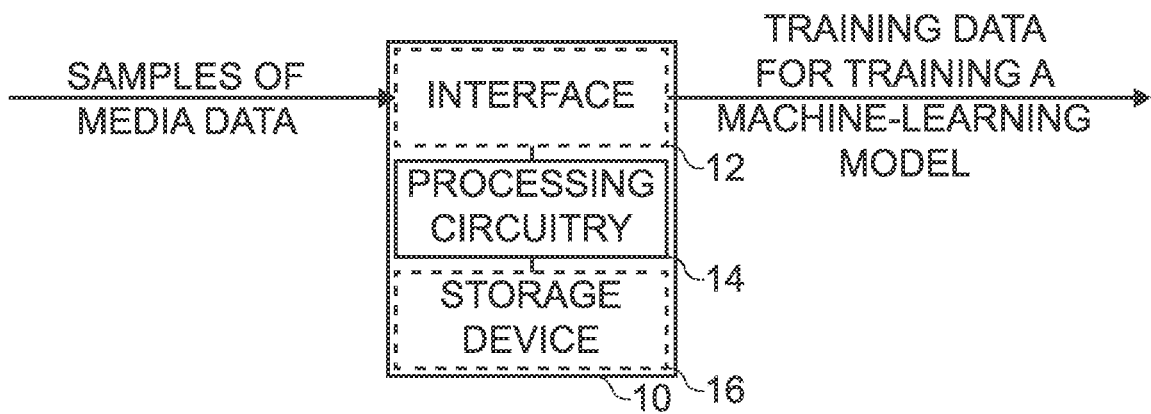
FIG. 1a shows a block diagram of an example of a computer system for generating training data for training a machine-learning model for use in re-identification.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Various aspects of the present disclosure relate to a method for automatically obtaining training images for deep learning. More particular, the proposed concept provides a method for automatically obtaining training images for training re-id (re-identification) systems based on deep learning.

In general, the training of machine-learning models for use in re-identification is based on human annotation—a human operator selects samples of media data (e.g., images) that represent the same person (or animal/objection), and groups the samples by the person being represented by the media data. This process is called "manual annotation", and is usually performed by a human annotator. For example, to prepare visual media data for training such a machine-learning model, this human annotator may create bounding boxes (that contain the person to be represented) and identify which faces are similar or dissimilar in pairs of samples.

The proposed concept provides an unsupervised method in which previously unknown images of identical people are identified to be similar (by using methods that might not require visual re-id codes). When connected to a live system with active cameras, this allows the creation of additional images that can subsequently be used for training a deep learning-based re-id code system, which will in turn yield higher accuracy for the resulting system. The resulting system may have a higher accuracy, as the number of training images, or more general samples of media data, is increased. Such a system may also be adaptive, potentially real-time, and allow small changes of a person's visual appearance over time.

In the following, examples are given in which training image samples for training a machine-learning model for a visual re-identification system are collected. While the following description often relates to visual person re-identification systems, the same approach may also be applied to other, non-visual types of media data, and to animals or objects (such as tools or vehicles).

FIG. 1a shows a block diagram of an example of a computer system 10 for generating training data for training a machine-learning model for use in re-identification. The computer system comprises processing circuitry 14, which is configured to provide the functionality of the computer system. Additionally, the computer system may comprise one or more interfaces 12 (for exchanging information) and/or one or more storage devices 16 (for storing information). As shown in FIG. 1a, the processing circuitry is coupled with the (optional) one or more interfaces 12 and one or more storage devices 16.

The processing circuitry is configured to obtain media data (e.g., via the one or more interfaces, or from the one or more storage devices). The media data comprises a plurality of samples representing a person, an animal or an object. The processing circuitry is configured to process the media data to identify tuples of samples that represent the same person, animal or object. The processing circuitry is configured to generate the training data based on the identified tuples of samples that represent the same person, animal or object.

Figure 1B:
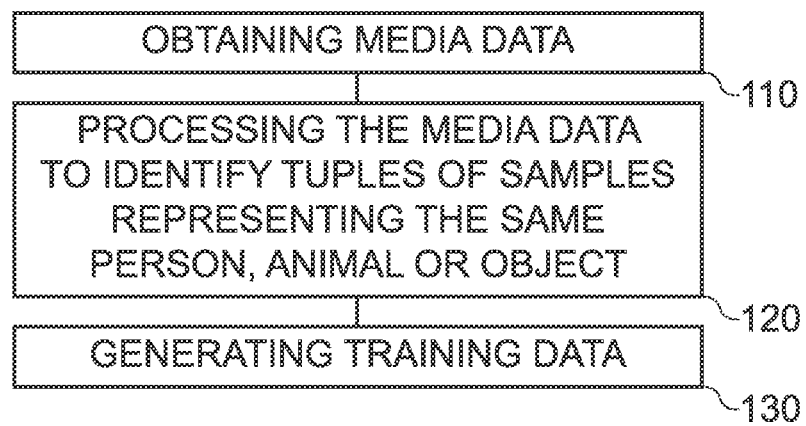
FIG. 1b shows a flow chart of an example of a method for generating training data for training a machine-learning model for use in re-identification.

FIG. 1b shows a flow chart of an example of a corresponding (computer-implemented) method for generating training data for training a machine-learning model for use in re-identification. The method comprises obtaining 110 the media data. The method comprises processing 120 the media data to identify the tuples of samples that represent the same person, animal or object. The method comprises generating 130 the training data based on the identified tuples of samples that represent the same person, animal or object.

The following description relates to both the computer system of FIG. 1a and to the corresponding method of FIG. 1b. Features described in connection with the computer system of FIG. 1a may likewise be applied to the corresponding method of FIG. 1b.

Various aspects of the present disclosure relate to a computer system, a method and a computer program for generating training data for training a machine-learning model for use in re-identification. In general, re-identification systems serve the purpose of distinguishing or re-identifying persons, animals or objects, from a representation of said persons, animals or objects. For example, visual person re-identification systems may be used to distinguish or re-identify persons that are visible in visual media data, e.g., of a surveillance camera. Assume a system with two surveillance cameras. From these cameras, two images may be obtained, each with a single person visible. The images may have been acquired from different angles and under different lighting conditions (or even from the same camera but at different points in time). Re-identification systems seek to infer whether the two images depict the same person or whether the images in fact show two different persons—even without knowledge of any actual identities. Furthermore, re-identification is not limited to the detection of persons in images—for example, re-identification may be performed on animals or objects, and using other types of media as well, such as three-dimensional models, text or audio.

Re-identification systems are often based on so-called re-identification codes, which are numerical representations of the person (or animal/object) represented by the respective media data. These codes are often generated using deep-learning based machine-learning models, which are trained to generate suitable re-identification codes based on the respective media data. In this context, the term "suitable" implies, that the re-identification codes being generated by the machine-learning models yield re-identification codes that are similar according to a similarity metric for two samples of media data representing the same (or highly similar) person, animal or object, and dissimilar according to the similarity metric for two samples of media data representing different and dissimilar persons, animals or objects. To achieve this effect, the respective machine-learning models are training using training data, such as the training data being generated by the proposed computer system, method and computer program.

In general, machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information, or classification information, as output. By training the machine-learning model with a large number of training images and associated training content information, the machine-learning model "learns" to recognize the content of the images, so the content of images that are not included of the training images can be recognized using the machine-learning model. The same principle may be used for other kinds of transformations as well, such as the generation of re-identification codes that have the above-referenced properties.

Machine-learning models are trained using training data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training.

One type of machine-learning algorithm being used to determine similarity between media is denoted triplet loss. In other words, the machine-learning model may be trained using a triplet-loss based training. In triplet loss, a baseline input is compared to a positive input and a negative input. The presented computer system, method and computer program may be used to identify samples that are to be provided at the baseline input, positive input and negative input of the triplet-loss based training. For example, the generated training data may comprise the plurality of tuples of samples, with each tuple of samples comprising samples that represent the same person, animal or object. For each set of inputs being used for training the machine-learning model, two samples of the same tuple may be used as baseline input and positive input, and a sample from a different tuple may be used as negative input of the triplet loss-based training.

Thus, the proposed approach is used to identify and group together samples that represent the same person, animal or object, so they can be used as baseline input and positive input of the triplet-loss based training, with another sample of another tuple being used as negative input.

In some examples, the order in which the samples of the tuples are chosen for the triplets of the triplet loss-based training may be determined. For example, a concept denoted "hard-negative mining" may be applied in the training, such that the triplets that are "hardest" are chosen first, e.g., by forming triplets where the baseline input and the positive input show the same person, object or animal, but have a large distance (e.g., according to a re-identification system).

While the concept is being explained with reference to triplet loss-based training, the training of the machine-learning model may alternatively be based on other supervised learning-, unsupervised learning- or reinforcement learning algorithms. For example, Ye et al: "Deep Learning for Person Re-identification: A Survey and Outlook" (2020)

provides examples for machine learning-based re-identification systems, with corresponding training methodologies.

The processing circuitry is configured to obtain the media data, with the media data comprising a plurality of samples representing a person, an animal or an object. While most examples are given in the context of visual (person) re-identification systems, different types of media data may be used for re-identification. In general, the media data may be visual, audio, or audio-visual media data. For example, the media data may be one of image data, video data, audio data, a three-dimensional representation of movement of an object (i.e. three-dimensional body movement) and text-based media data/input. The media data may accordingly originate from various types of media data generation devices, such as cameras or camera sensors, microphones, three-dimensional scanners or text acquisition systems. In various examples, image samples of one or more video streams (e.g., of one or more surveillance cameras) may be used. For example, the proposed method may go through an active video stream (or one which was previously recorded), which may originate from a single camera or multiple cameras.

The processing circuitry is configured to process the media data to identify the tuples of samples that represent the same person, animal or object. Before the samples are grouped into the tuples, in various examples, one or more pre-processing tasks may be performed, depending on the input expected by the respective machine-learning model. For example, pre-processing may be performed to isolate the portions of the samples of media data that show the person, animal or object of interest. In visual media data, this task may be accomplished by generating bounding boxes around the person, animal or object represented by the respective sample, using another machine-learning model. In general, Convolutional Neural Networks (CNNs) are often used to generate such bounding boxes. The resulting bounding boxes may be used to crop the image samples. In some cases, if two or more bounding boxes are generated, two or more portions of the image samples may be output. If the generation of the bounding box fails, the sample may be discarded, as it is unlikely to show a person, animal or object of interest. For example, the processing circuitry may be configured to determine a presence of a person, animal or object in the samples of the plurality of samples (e.g., by attempting to generate a bounding box in the sample of the sample is an image sample), and to discard a sample if the determination of the presence of the person, animal or object fails. The approach may classify persons, animals or objects (i.e. determine the presence and/or positions of persons, animals or objects) in each image by using traditional deep learning methods.

The processing circuitry is configured to identify the tuples of samples that represent the same person, animal or object, and to group the samples in the tuples. In general, a tuple is a group of values comprising zero or more elements, in an ordered fashion. In the context of the present application, however, the order of the samples within the tuple is without meaning, as merely the adherence of a sample to a tuple may be relevant to the training of the machine-learning model. Therefore, the described tuple may also be understood as "set" or "group" of samples. Also, each tuple may comprise one or more samples (unless a non-zero tuple had one or more samples removed).

In general, a setup may be used in which a secondary source of information (which is usually not based on visual re-id codes) is used to identify pairs of images that feature the same person (or animal/object), and to group these pairs of images, or more general media data, within the same tuple. In other words, each sample may be associated with secondary information characterizing the sample or the person, animal or object represented by the sample. The secondary information may take many forms, as outlined in more detail below, and characterizes the sample (e.g., the origin of the sample, the time the sample was recorded) or the person, animal or object represented by the sample (e.g., a secondary identifier that was recorded at the same time as a sample). The processing circuitry may be configured to identify the tuples of samples that represent the same person, animal or object based on the secondary information being associated with the respective samples.

Figure 1C:
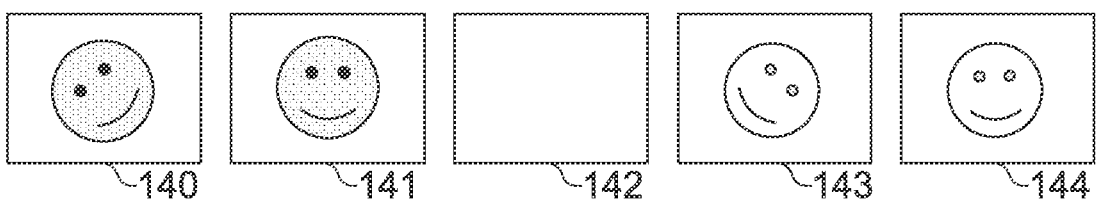
FIG. 1c shows a schematic diagram of images of a sequence of images representing different persons.

In various examples, a secondary source of information (not re-id) is used to identify different pairs of images that feature the same person. This can be carried out on a single camera, for example, by tracking a person over several frames (making sure that there is only one person in view) using, e.g., a traditional Kalman tracker. FIG. 1c shows a schematic diagram of images of a sequence of images representing different persons. FIG. 1c shows a sequence of image samples 140-144, with image samples 140 and 141 showing a first person, image samples 143 and 144 showing a second person, and image sample 142 not showing a person at all. The proposed concept may be used to determine that image samples 140 and 141, and image samples 143 and 144 represent the same person, and thus assign them to the same tuple. This determination may be based on the position of the image samples within the sequence, such that subsequent image samples may be deemed to show the same person, animal or object, until that person animal or object is no longer represented by a subsequent image sample within the sequence. In other words, if the media data comprises a sequence of image samples, such as a video stream, the secondary information may characterize a position of the respective sample within the sequence of image samples, e.g., a frame number within a video stream. Based on the position within the image sequence (the frame number within the video stream) other, e.g., subsequent or preceding, image samples may be identified that show the same person, animal or object. The tuples of samples that represent the same person, animal or object may be identified based on the position of the respective samples within the sequence of image samples.

Figure 1D:
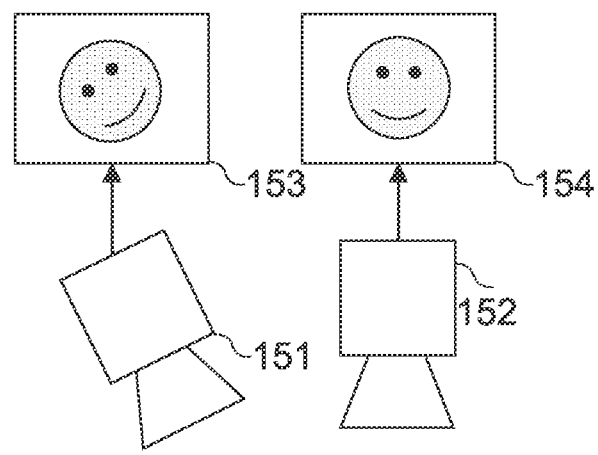
FIG. 1d shows a schematic diagram of a scenario with two cameras covering an overlapping field of view.
Figure 1D:
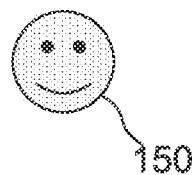

Another type of secondary information may be used when visual media data of two cameras is being used. If a person, animal or object is visible simultaneously on two or more overlapping cameras (but from different angles), another approach is to obtain image pairs from separate cameras that point to the same position in space (and thus have an at least partially overlapping field of view) occupied by the person (and where each image is obtained at the same point in time). FIG. 1d shows a schematic diagram of a scenario with two cameras 151; 152 covering an overlapping field of view that covers the same person 150. This person is shown in two image samples 153; 154 that are recorded at the same time. If such a relationship is known, it can be used to determine a pairs of image samples representing the same person, animal or object. In other words, if the media data comprises media data (e.g., visual media data, image data) of two or more cameras, the secondary information may characterize an origin of the respective sample with respect to the two or more cameras and a capture time of the sample. In this context, the term "origin" refers to the camera of the two or more cameras that has recorded the respective sample. Moreover, each camera may be associated with a position in space, and a field of view at that position of space. If two cameras have fields of view that overlap at a position of space, i.e. that show the same position of space, samples recorded by these cameras, at the same time, may be deemed to show the same person, animal or object. Accordingly, the media data of the two or more cameras may show an at least partially overlapping field of view. The processing circuitry may be configured to identify the tuples of samples that represent the same person, animal or object based on the origin of the samples with respect to the two or more cameras and based on the capture time of the samples.

On non-overlapping multi-camera setups where it is possible to track a person over multiple cameras (by some other existing method), images from different cameras can also be identified even if not obtained at the same point in time, e.g., based on their estimated transition time between fields of view of these cameras.

Figure 1E:
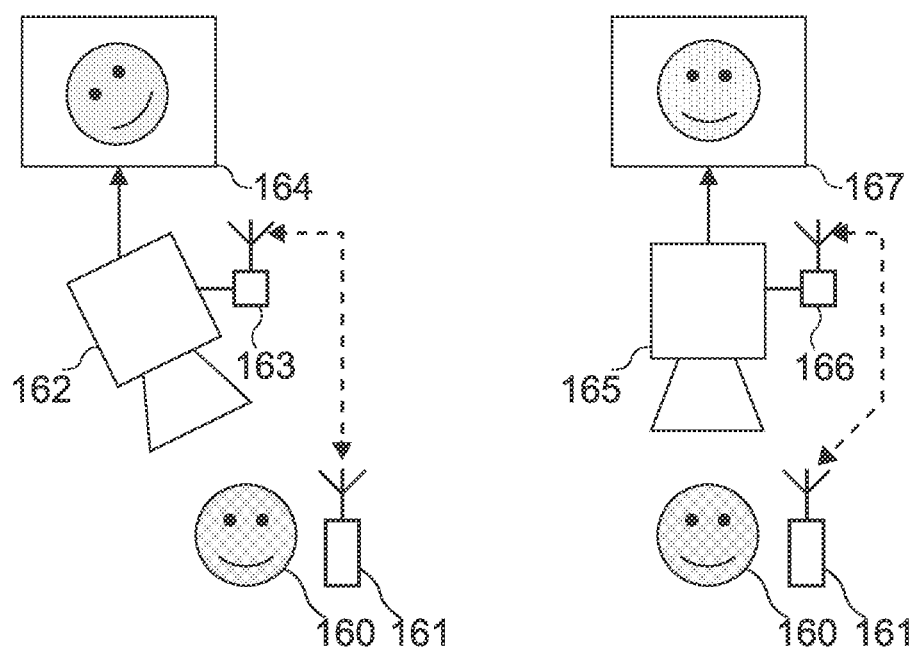
FIG. 1e shows a schematic diagram of a scenario with two cameras being equipped with wireless communication devices.

In some system, a secondary identifier, that is recorded at (substantially) the same time as the respective sample, may be used to characterize the samples. The secondary source of information may also be non-visual clues (i.e. secondary identifiers) like Bluetooth or Wi-Fi identification (Media Access Control (MAC) address) of a mobile phone, identity cards or personalized access tokens (customized keys, access cards etc.). In other words, the secondary information may comprise information on a (secondary) identifier, such as a wireless communication identifier, an access token identifier, an identify card identifier etc., being recorded with the sample of the media data. For example, the wireless communication identifier may be a Media Access Control (MAC) identifier of a mobile device carried by, or attached to, the person, animal or object represented by the sample. The processing circuitry may be configured to identify the tuples of samples that represent the same person, animal or object based on the (secondary) identifiers being recorded with the respective samples. One such scenario is shown in FIG. 1e, where two cameras are each associated with a wireless communication device, e.g., a Bluetooth or WiFi receiver, which are used to record the wireless communication identifiers of the mobile devices (such as smartphones, smart watches, smart collars, or object trackers) of the persons, animals or objects being recorded by the two cameras. FIG. 1e shows a schematic diagram of a scenario with two cameras being equipped with wireless communication devices. In FIG. 1e, a person 160 that is carrying a mobile device 161 is recorded by a first camera 162 to generate a first image sample 164, while a wireless communication identifier of the mobile device 161 is recorded by a first wireless communication device 163 that is associated with the first camera and recorded with the first image sample. The same person 160 is subsequently recorded by a second camera 165 to generate a second image sample 167, with the wireless communication identifier being recorded by a second wireless communication device 166 being associated with the second camera 165, and the recorded wireless communication identifier is recorded with the second image sample. Using the wireless communication identifiers, which might not change between the two recordings, the two images samples may be assigned to the same tuple.

The different sources of information can be combined, i.e., the system does not need to rely on a single source of information. For example, the system may use both MAC addresses and temporal tracking. These may then be used afterwards for training a re-id system.

Alternatively (or additionally) to the use of a non-re-identification based secondary source of information, another re-identification may be used to identify images that represent the same person. Accordingly, the processing circuitry may be configured to identify the tuples of samples using a first re-identification system. For example, a lower-accuracy re-id system that might only work sometimes can also be used to (sometimes) identify pairs of key frames in a video in which the lower-accuracy re-id system is certain of the identity of a person across multiple samples. From these images, the identity of the person can then be tracked to adjacent frames (in time) by, e.g., a Kalman tracker to increase the number of correctly identified image pairs. The training data, however, may be generated for the training of a machine-learning model for use in a second (different) re-identification system.

Subsequently, a filter may be applied that removes "bad images" (or general "bad media data"), i.e. images of a quality that is potentially unsuitable for training the machine-learning model. In other words, the processing circuitry may be configured to determine a quality of the samples of the tuples, and to remove a sample from a tuple if the quality of the sample is insufficient according to a pre-defined rule. For example, bad images may be images that do not provides a clear view of the person. For example, the media data may represent a person. The quality of the samples of a tuple may be determined based on a visibility of a face of the person in the respective samples. Several heuristics can be used to implement such a filter, for example by identifying the orientation of the face by analyzing the position of the eyes, ears, nose and/or mouth). In some examples, the "bad image" filter may also apply a crude re-id code-based system to filter away image pairs by simply rejecting images for which the corresponding re-id codes are very far from each other. In other words, the processing circuitry may be configured to use a re-identification system to generate re-identification codes representing the person, animal or object represented by the respective samples. The quality of the samples of a tuple may be based on a distance between the re-identification codes generated for the samples of the tuple. For example, the processing circuitry may be configured to use a re-identification system to generate re-identification codes based on the samples of a tuple, and to discard one or more samples of the tuple based on the mutual distance between the tuples (e.g., to eliminate outliers based on the distance of their re-identification code to the re-identification codes of other samples of the tuple).

Finally, the harvested tuples, i.e., tuples obtained for example as described in this disclosure, e.g., pairs of images of similar persons, may be used to train a (machine-learning model of a) re-id system.

To summarize, the system may use an existing system to categorize and track people in images. On top of this, a secondary source for information that can identify different images of the same person may be used. This identification may be carried out, as explained above, by spatially or temporally (or by other means) tracking the persons. The identified image pairs may subsequently be used to train a re-id system. Optionally, to enhance the accuracy of the training, filters may be used to filter away bad image pairs according to some criteria.

One particular implementation of the system relates to re-identification-based access systems. These may be used to enable implementation of an access system based on facial recognition in which people's looks are allowed to change slowly over time. If a person changes their look incrementally (by growing their hair or beard longer for example), and checks in every day, then the system will still be able to track over many days (because of the small amount of change). Accordingly, the plurality of samples may be obtained over a plurality of days from a re-identification-based access control system. After some time, e.g., a month, the system will have harvested enough images to identify the person both, e.g., when the hair is short (the original situation) or when the hair is long (the final situation). To assign the image samples to the tuple comprising media data of the respective person, an identifier of the person, as determined by the re-identification-based access control system, may be used. In other words, the secondary information may comprise information on an identifier of a person provided by the re-identification-based access control system (e.g., with the determination being based on a comparison with previous re-identification codes being associated with that person). A newly obtained sample is added to the tuple of samples that represents the respective person. When e.g., the hair is cut again, the re-identification will remain accurate.

Figure 1F:
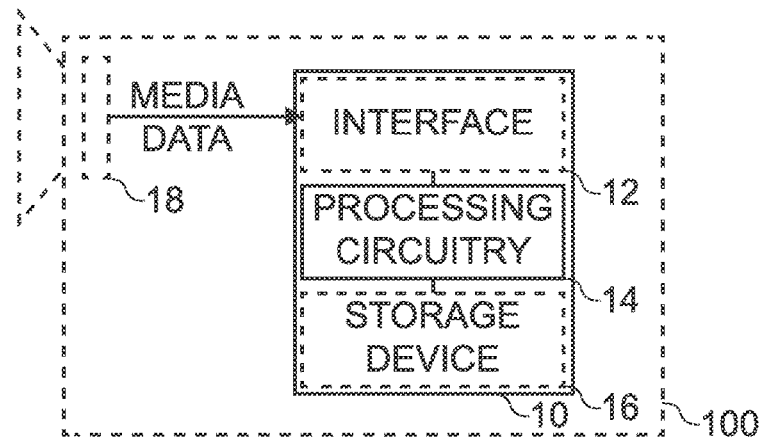
FIG. 1f shows a schematic diagram of a re-identification-based access control system.

FIG. 1f shows a schematic diagram of such a re-identification-based access control system 100, which comprises the computer system 10 and a camera 18, which is used to provide the media data (e.g., image data) to the computer system. The processing circuitry of the computer system may be configured to adapt a machine-learning model being used for re-identification in the re-identification-based access control system based on the generated training data, e.g., by continuing the training of the machine-learning model using the newly obtained samples.

As mentioned above, the training data is generated for training a machine-learning model for use in re-identification, e.g., using the above-referenced triplet-loss based training. In various examples, this task may be performed by another computer system, e.g., a computer system comprising a computing accelerator, such as a General-Purpose Graphics Processing Unit (GPGPU), an Application Specific Integrated Circuitry (ASIC) for accelerating the training of machine-learning models, or a Field Programmable Gate Array (FPGA) for accelerating the training of machine-learning models. Alternatively, the training may be performed by the same computer system that generates the training data. In other words, the processing circuitry may be configured to train the machine-learning model using the generated training data. The machine-learning model may be trained to generate a re-identification code based on media data being provided at an input of the machine-learning model. In other words, the trained machine-learning model may be trained to accept media data at its input, and to provide a re-identification code representing the person, animal or object represented by the media data at its output.

For example, the machine-learning model may be trained using the triplet loss-based training, by providing, for a plurality of pairs of samples of the plurality of tuples (with each pair comprising samples of a single tuple), a first sample of the pair as baseline input and a second sample of the pair as positive input, and a third sample that is taken from another tuple as the negative input. This procedure may be repeated for the plurality of pairs of samples to train the machine-learning model. The machine-learning model may then be verified by inputting samples of media data, and comparing the resulting re-identification codes, e.g., to make sure that the re-identification codes of samples representing the same person, animal or object have a high degree of similarity (according to a similarity metric), and that the re-identification codes of samples representing different persons, animals or objects have a lower degree of similarity (according to the similarity metric).

As has been pointed out, the above approach was discussed for the use-case of generating training data for training a machine-learning model for use in re-identification. Additionally or alternatively, the proposed method may be used for obtaining training images for other systems than re-id. For example object categories (e.g., automatically collecting images of dogs from different angles). If one image is classified, the classification can be carried to neighboring images in the video stream (by visual tracking).

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g., based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input. In at least some embodiments, the machine-learning model may be deep neural network, e.g., a neural network comprising one or more layers of hidden nodes (i.e. hidden layers), prefer-ably a plurality of layers of hidden nodes.

Alternatively, the machine-learning model may be a support vector machine. Support vector machines (i.e. support vector networks) are supervised learning models with associated learning algorithms that may be used to analyze data, e.g., in classification or regression analysis. Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model.

A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

The one or more interfaces 12 may correspond to one or more inputs and/or outputs for receiving and/or transmitting information, which may be in digital (bit) values according to a specified code, within a module, between modules or between modules of different entities. For example, the one or more interfaces 12 may comprise interface circuitry configured to receive and/or transmit information.

The processing circuitry 14 may be implemented using one or more processing units, one or more processing devices, any means for processing, such as a processor, a computer or a programmable hardware component being operable with accordingly adapted software. In other words, the described function of the processing circuitry 14 may as well be implemented in software, which is then executed on one or more programmable hardware components. Such hardware components may comprise a general-purpose processor, such as a Central Processing Unit (CPU) a Digital Signal Processor (DSP), a micro-controller, etc. In some examples, the processing circuitry may comprise at least one of a General-Purpose Graphics Processing Unit (GPGPU), an Application Specific Integrated Circuitry (ASIC) for accelerating the training of machine-learning models, or a Field Programmable Gate Array (FPGA) for accelerating the training of machine-learning models.

In various examples, the one or more storage devices 16 may comprise at least one element of the group of a computer readable storage medium, such as an magnetic or optical storage medium, e.g., a hard disk drive, a flash memory, Floppy-Disk, Random Access Memory (RAM), a Read Only Memory (ROM), Programmable Read Only Memory (PROM), Erasable Programmable Read Only Memory (EPROM), an Electronically Erasable Programmable Read Only Memory (EEPROM), or a network storage.

More details and aspects of the computer system, method and computer program for generating training data are mentioned in connection with the proposed concept or one or more examples described above or below (e.g., FIGS. 2a to 2b). The computer system, method and computer program for generating training data may comprise one or more additional optional features corresponding to one or more aspects of the proposed concept or one or more examples described above or below.

Figure 2A:
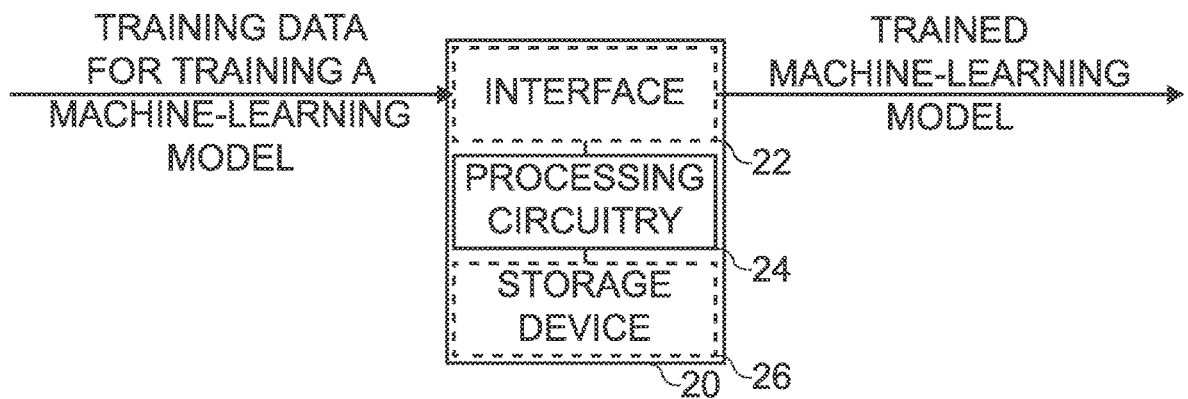
FIG. 2a shows a block diagram of an example of a computer system for training a machine-learning model for use in re-identification.

FIG. 2a shows a block diagram of an example of a computer system 20 for training a machine-learning model for use in re-identification. The computer system comprises processing circuitry 24, which is configured to provide the functionality of the computer system. Additionally, the computer system may comprise one or more interfaces 22 (for exchanging information) and/or one or more storage devices 26 (for storing information). As shown in FIG. 2a, the processing circuitry is coupled with the (optional) one or more interfaces 22 and one or more storage devices 26.

The processing circuitry is configured to obtain training data for training the machine-learning model. The training data is generated by a computer system, method or computer program for generating training data as introduced in connection with FIGS. 1a to 1f. The processing circuitry is configured to train the machine-learning model using the obtained training data. The machine-learning model is trained to generate a re-identification code based on media data being provided at an input of the machine-learning model.

Figure 2B:
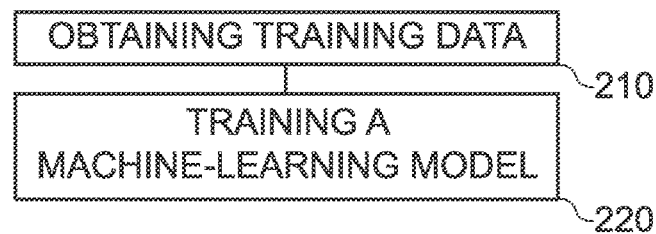
FIG. 2b shows a flow chart of an example of a method for training a machine-learning model for use in re-identification.

FIG. 2b shows a flow chart of an example of a corresponding (computer-implemented) method for training a machine-learning model for use in re-identification. The method comprises obtaining 210 the training data for training the machine-learning model. The method comprises training 220 the machine-learning model using the obtained training data.

The following description relates to both the computer system of FIG. 2a and to the corresponding method of FIG. 2b. Features described in connection with the computer system of FIG. 2a may likewise be applied to the corresponding method of FIG. 2b.

Various aspects of the present disclosure relate to the training of the machine-learning model for use in re-identification. In general, the training of the machine-learning model has been introduced in connection with FIGS. 1a and/or 1b, where the training of the machine-learning model is performed by the same computer system that is used to generate the training data. In particular, the training may be a triplet loss-based training, as introduced above.

In many cases, however, the computer system used for training the machine-learning model may be separate from the computer system used for generating the training data. Accordingly, in FIGS. 2a and/or 2b, a computer system, method and computer program is introduced, which can be used to train the machine-learning model based on the training data generated by the computer system, method and computer program introduced in connection with FIGS. 1a and/or 1b. Accordingly, the training data is generated by the above computer system, method and computer program, and may be obtained from the above computer system, method and computer program, e.g., via the interface 22 and a computer network, or from a removable storage. Accordingly, obtaining the training data may comprise receiving the training data from the computer system of FIG. 1a, e.g., via a computer network, or reading out the training data from a removable storage being attached to the computer system.

The one or more interfaces 22 may correspond to one or more inputs and/or outputs for receiving and/or transmitting information, which may be in digital (bit) values according to a specified code, within a module, between modules or between modules of different entities. For example, the one or more interfaces 22 may comprise interface circuitry configured to receive and/or transmit information.

The processing circuitry 24 may be implemented using one or more processing units, one or more processing devices, any means for processing, such as a processor, a computer or a programmable hardware component being operable with accordingly adapted software. In other words, the described function of the processing circuitry 24 may as well be implemented in software, which is then executed on one or more programmable hardware components. Such hardware components may comprise a general-purpose processor, such as a Central Processing Unit (CPU) a Digital Signal Processor (DSP), a micro-controller, etc. In some examples, the processing circuitry may comprise at least one of a General-Purpose Graphics Processing Unit (GPGPU), an Application Specific Integrated Circuitry (ASIC) for accelerating the training of machine-learning models, or a Field Programmable Gate Array (FPGA) for accelerating the training of machine-learning models.

In various examples, the one or more storage devices 26 may comprise at least one element of the group of a computer readable storage medium, such as an magnetic or optical storage medium, e.g., a hard disk drive, a flash memory, Floppy-Disk, Random Access Memory (RAM), a Read Only Memory (ROM), Programmable Read Only Memory (PROM), Erasable Programmable Read Only Memory (EPROM), an Electronically Erasable Programmable Read Only Memory (EEPROM), or a network storage.

More details and aspects of the computer system, method and computer program for training the machine-learning model are mentioned in connection with the proposed concept or one or more examples described above or below (e.g., FIG. 1a to 1f). The computer system, method and computer program for training the machine-learning model may comprise one or more additional optional features corresponding to one or more aspects of the proposed concept or one or more examples described above or below.

In general, the proposed concept relates to computer vision, machine learning, video analytics, access control, and/or people flow monitoring.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A computer system for generating training data for training a machine-learning model for use in re-identification, the computer system comprising processing circuitry configured to:
   obtain media data, the media data comprising a plurality of samples representing a person, an animal or an object,
      wherein each sample is associated with secondary information characterizing the sample or the person, animal or object represented by the sample, and
      wherein, if the media data comprises media data of two or more cameras, the secondary information characterizes an origin of the respective sample with respect to the two or more cameras and a capture time of the sample;
   process the media data to identify tuples of samples that represent the same person, animal or object, wherein the processing circuitry is configured to identify the tuples of samples that represent the same person, animal or object based on:
      the secondary information being associated with the respective samples,
      the origin of the samples with respect to the two or more cameras, and
      the capture time of the samples; and
   generate the training data based on the identified tuples of samples that represent the same person, animal or object.

2. The computer system according to claim 1, wherein, if the media data comprises a sequence of image samples, the secondary information characterizes a position of the respective sample within the sequence of image samples, wherein the tuples of samples that represent the same person, animal or object are identified based on the position of the respective samples within the sequence of image samples.

3. The computer system according to claim 1, wherein the secondary information comprises information on a wireless communication identifier being recorded with the sample of the media data, wherein the processing circuitry is configured to identify the tuples of samples that represent the same person, animal or object based on the wireless communication identifiers being recorded with the respective samples.

4. The computer system according to claim 1, wherein the processing circuitry is configured to identify the tuples of samples using a first re-identification system, wherein the training data is generated for the training of a machine-learning model for use in a second re-identification system.

5. The computer system according to claim 1, wherein the processing circuitry is configured to determine a presence of a person, animal or object in the samples of the plurality of samples, and to discard a sample if the determination of the presence of the person, animal or object fails.

6. The computer system according to claim 1, wherein the processing circuitry is configured to determine a quality of the samples of the tuples, and to remove a sample from a tuple if the quality of the sample is insufficient according to a pre-defined rule.

7. The computer system according to claim 6, wherein the media data represents a person, wherein the quality of the samples of a tuple is determined based on a visibility of a face of the person in the respective samples.

8. The computer system according to claim 6, wherein the processing circuitry is configured to use a re-identification system to generate re-identification codes representing the person, animal or object represented by the respective samples, wherein the quality of the samples of a tuple is based on a distance between the re-identification codes generated for the samples of the tuple.

9. A re-identification-based access control system comprising:
a computer system for generating training data comprising processing circuitry configured to:
obtain media data, the media data comprising a plurality of samples representing a person, wherein each sample is associated with secondary information characterizing the sample or the person represented by the sample;
process the media data to identify tuples of samples that represent the same person, wherein the processing circuitry is configured to identify the tuples of samples that represent the same person based on the secondary information being associated with the respective samples; and
generate the training data based on the identified tuples of samples that represent the same person,
wherein the plurality of samples are obtained over a plurality of days from the re-identification-based access control system, wherein the secondary information comprises information on an identifier of a person provided by the re-identification-based access control system, wherein a newly obtained sample is added to the tuple of samples that represents the respective person, and wherein the processing circuitry of the computer system is configured to adapt a machine-learning model being used for re-identification in the re-identification-based access control system based on the generated training data.

10. A non-transitory, computer-readable medium storing program code that, when executed by a computer system, performs a method for generating training data for training a machine-learning model for use in re-identification, the method comprising:
obtaining media data, the media data comprising a plurality of samples representing a person, an animal or an object,
wherein each sample is associated with secondary information characterizing the sample or the person, animal or object represented by the sample, and
wherein, if the media data comprises media data of two or more cameras, the secondary information characterizes an origin of the respective sample with respect to the two or more cameras and a capture time of the sample;
processing the media data to identify tuples of samples that represent the same person, animal or object, wherein the tuples of samples that represent the same person, animal or object are identified based on:
the secondary information being associated with the respective samples,
the origin of the samples with respect to the two or more cameras, and
the capture time of the samples; and
generating the training data based on the identified tuples of samples that represent the same person, animal or object.

11. A computer system for training a machine-learning model for use in re-identification, the computer system comprising processing circuitry being configured to:
obtain training data for training the machine-learning model, wherein the training data is generated by a computer system for generating training data comprising processing circuitry configured to:
obtain media data, the media data comprising a plurality of samples representing a person, an animal or an object,
process the media data to identify tuples of samples that represent the same person, animal or object, and
generate the training data based on the identified tuples of samples that represent the same person, animal or object; and
train the machine-learning model using the obtained training data, the machine-learning model being trained to generate a re-identification code based on media data being provided at an input of the machine-learning model.

12. The computer system according to claim 11, wherein the machine-learning model is trained using a triplet loss-based training, with the samples of a tuple being used as a baseline and a positive input of the triplet loss-based training.

13. A non-transitory, computer-readable medium storing program code that, when executed by a computer system, performs a method for training a machine-learning model for use in re-identification, the method comprising:
obtaining training data for training the machine-learning model, wherein the training data is generated by:
obtaining media data, the media data comprising a plurality of samples representing a person, an animal or an object,
processing the media data to identify tuples of samples that represent the same person, animal or object, and
generating the training data based on the identified tuples of samples that represent the same person, animal or object; and
training the machine-learning model using the obtained training data, the machine-learning model being trained to generate a re-identification code based on media data being provided at an input of the machine-learning model.

* * * * *